US012589378B2

(12) United States Patent
Deng et al.

(10) Patent No.: US 12,589,378 B2
(45) Date of Patent: Mar. 31, 2026

(54) MODIFIED NANOSCALE ZERO-VALENT IRON (NZVI) AND PREPARATION METHOD AND APPLICATION THEREOF

(71) Applicant: Chinese Research Academy of Environmental Sciences, Beijing (CN)

(72) Inventors: Sheng Deng, Beijing (CN); Yu Yang, Beijing (CN); Beidou Xi, Beijing (CN); Yonghai Jiang, Beijing (CN); Xu Han, Beijing (CN); Fu Xia, Beijing (CN); Han Xiao, Beijing (CN); Shuxuan Wu, Beijing (CN); Tianyu Ju, Beijing (CN)

(73) Assignee: Chinese Research Academy of Environmental Sciences, Beijing (CN)

( * ) Notice: Subject to any disclaimer, the term of this patent is extended or adjusted under 35 U.S.C. 154(b) by 355 days.

(21) Appl. No.: 18/224,784

(22) Filed: Jul. 21, 2023

(65) Prior Publication Data

US 2024/0024844 A1 Jan. 25, 2024

(30) Foreign Application Priority Data

Jul. 22, 2022 (CN) .......................... 202210870230.8

(51) Int. Cl.
*B01J 20/02* (2006.01)
*B01J 20/26* (2006.01)
(Continued)

(52) U.S. Cl.
CPC ......... *B01J 20/0229* (2013.01); *B01J 20/262* (2013.01); *B01J 20/28016* (2013.01);
(Continued)

(58) Field of Classification Search
None
See application file for complete search history.

(56) References Cited

FOREIGN PATENT DOCUMENTS

| CN | 108642861 A | * 10/2018 | ............. D06M 15/37 |
| CN | 109433167 A | * 3/2019 | ................ C02F 1/28 |
| CN | 112795033 A | * 5/2021 | ................ C08J 5/18 |

OTHER PUBLICATIONS

Matome et al. (South African Journal of Chemical Engineering, 2020, 34, 1-10). (Year: 2020).*

(Continued)

*Primary Examiner* — Clare M Perrin

(57) ABSTRACT

Disclosed are a modified nanoscale zero-valent iron (nZVI) and a preparation method and an application thereof. The preparation method of the modified nZVI includes the following steps: S1: mixing nZVI, a stabilizer and an oxidant together and stirring in an inert atmosphere to obtain a polymerization precursor solution; and S2: dripping pyrrole into the polymerization precursor solution prepared in the S1, maintaining an inert gas atmosphere for polymerization reaction, and performing cooling, filtration and vacuum drying to obtain the modified nZVI. According to the preparation method of the modified nZVI in the present disclosure, nZVI, stabilizer and oxidant are mixed to prepare a polymerization precursor solution, into which pyrrole is added for polymerization to obtain uniformly-coated modified nZVI, thereby forming a comprehensive mechanical support, which cannot only effectively improve oxidation property and structural stability of nZVI, but also promote reactivity of nZVI with heavy metal (semimetal) ions or radioactive elements.

8 Claims, 6 Drawing Sheets

(51) Int. Cl.

| | |
|---|---|
| *B01J 20/28* | (2006.01) |
| *B01J 20/30* | (2006.01) |
| *B01J 20/32* | (2006.01) |
| *C02F 1/28* | (2023.01) |
| *C08G 73/06* | (2006.01) |
| *C02F 101/00* | (2006.01) |
| *C02F 101/10* | (2006.01) |
| *C02F 101/22* | (2006.01) |
| *C02F 103/06* | (2006.01) |

(52) U.S. Cl.

CPC ....... *B01J 20/3085* (2013.01); *B01J 20/3242* (2013.01); *B01J 20/3272* (2013.01); *C02F 1/288* (2013.01); *C08G 73/0611* (2013.01); *B01J 20/3042* (2013.01); *B01J 20/3231* (2013.01); *C02F 1/281* (2013.01); *C02F 1/285* (2013.01); *C02F 2101/006* (2013.01); *C02F 2101/103* (2013.01); *C02F 2101/22* (2013.01); *C02F 2103/06* (2013.01)

(56) References Cited

OTHER PUBLICATIONS

Bhaumik et al. (Separation and Purification Technology, 2013, 110, 11-19). (Year: 2013).*
Poormirzaei (Journal of Molecular Structure, 2021, 1227, 129265). (Year: 2021).*
Alsaiari et al. (Polymers, 2021, 13, 3691) (Year: 2021).*
Lei et al. (Science of the Total Environment, 2022, 831, 154754). (Year: 2022).*
Lin et al. (Nanomaterials, 2020, 10(7), 1370). (Year: 2020).*
Galdames et al. (Environmental Research and Public Health, 2020, 17, 5817). (Year: 2020).*
Hlekelele et al. (RSC Advances, 2019, 9, 14531-14543). (Year: 2019).*
Chigondo et al. (Water Science & Technology, 2022, 85, 1601). (Year: 2022).*
Machine translation of CN-112795033-A, pp. 1-9. (Year: 2021).*
Machine translation of CN-109433167-A, pp. 1-7. (Year: 2019).*
Machine translation of CN-108642861-A, pp. 1-8. (Year: 2018).*

* cited by examiner

MODIFIED NANOSCALE ZERO-VALENT IRON (NZVI) AND PREPARATION METHOD AND APPLICATION THEREOF

CROSS-REFERENCE TO RELATED APPLICATIONS

This is a U. S. patent application which claims the priority and benefit of Chinese Patent Application Number 202210870230. 8, filed on Jul. 22, 2022, the disclosure of which is incorporated herein by reference in its entirety.

TECHNICAL FIELD

The present disclosure belongs to the technical field of environmental remediation, and particularly relates to a modified nanoscale zero-valent iron (nZVI) and a preparation method and an application thereof.

BACKGROUND

Rapid economic development in China drives up the people's living standards and pushed ahead with the industrialization. The discharge of urban industrial wastewater and domestic sewage increased, a great amount of (semimetal) heavy metal ions or radioactive elements, such as chromium (Cr6+), arsenic (As5+) and uranium (UO22+), have been discharged into the nature accordingly, bringing about a heavy burden and serious crisis to the environment and ecology. Due to its high toxicity, persistence, difficult to degrade and other characteristics, heavy metal pollution, once entering the human body through a food chain, will accumulate in living tissues, thereby causing various diseases and endangering human health. In order to effectively reduce damage caused by (semimetal) heavy metal ions or radioactive elements to ecological environment and human health, many environmentalists are sparing no effort to explore harmless, reduced and resource-oriented treatment technology for harmful metal ions, and are constantly developing economical and efficient, environmentally friendly and widely applicable treatment materials for radioactive elements or heavy metal ions.

In recent years, a variety of remediation technologies for (semimetal) heavy metal ions and radioactive elements have been developed, including adsorption, ion exchange, membrane filtration, electrodialysis, reverse osmosis, oxidation reduction, ultrafiltration, photocatalysis, and the like. With the development of material technology, types of materials have gradually increased, and more and more materials can be used to remove metal ions, which has greatly promoted the treatment of radioactive elements and heavy metal ions in water bodies. Nanoscale zero-valent iron (nZVI) has a relatively high specific surface area, high reactivity and economic applicability, showing potential advantages in wastewater treatment and groundwater remediation. nZVI can efficiently remove (semimetal) heavy metal ions or radioactive elements in the water bodies through adsorption, reduction, complexation, precipitation and other processes. However, nZVI will inevitably form a surface oxide layer in the preparation and storage process, so that it will suffer a "hysteresis effect" in removing pollutants, and its reaction capacity will decrease with the prolongation of reaction time. In order to improve the applicability of nZVI, it is necessary to adjust its surface chemical properties, improve the stability and dispersion of zero-valent iron, and strengthen its reactivity to pollutants.

nZVI surface functional materials include carbon materials, polymers, metal-organic framework materials, oxides, and the like, but these materials are usually only used as nZVI carriers to improve dispersion and stability of the materials, and they do not play a role in directly improving the removal of pollutants, the preparation process is complicated, moreover, a single mechanical support cannot fully stabilize the dispersed zero-valent iron, thereby resulting in possible shedding or re-oxidation deactivation of the zero-valent iron. Therefore, there is an urgent need for a technical solution to solve the above problems.

SUMMARY

One of objectives of the present disclosure is: aiming at defects in the prior art, the present disclosure provides a preparation method of a modified nanoscale zero-valent iron (nZVI), where nZVI, a stabilizer and an oxidant are mixed to prepare a polymerization precursor solution, into which pyrrole is added for polymerization to obtain uniformly coated modified nZVI, thereby improving structural stability of nZVI and preventing it from shedding or re-oxidation deactivation.

In order to achieve the above objective, the present disclosure adopts the following technical solution:

A preparation method of a modified nZVI, including the following steps:

S1: mixing nZVI, a stabilizer and an oxidant together and stirring in an inert atmosphere to obtain a polymerization precursor solution; and S2: dripping pyrrole into the polymerization precursor solution prepared in the S1, maintaining an inert gas atmosphere for polymerization reaction, and performing cooling, filtration and vacuum drying to obtain the modified nZVI.

Preferably, the ratio in parts by weight of the nZVI to the stabilizer to the oxidant in the S1 is 1-30:1-6:0.1-5.

Preferably, the ratio in parts by weight of the pyrrole to the polymerization precursor solution in the S2 is 0.001-0.05: 20-500.

Preferably, the oxidizer is one or more of ferric chloride, ferric nitrate nonahydrate or ammonium persulphate.

Preferably, the stabilizer is one or more of polyvinyl alcohol, polyvinylpyrrolidone, or sodium alginate.

Preferably, the mass ratio of the stabilizer to the oxidizer is greater than 2:1.

Preferably, the stirring time in the S1 is 20-60 min.

Preferably, the polymerization reaction time in the S2 is 1-6 h.

The second objective of the present disclosure is: aiming at defects in the prior art, the present disclosure provides a modified nZVI, the surface thereof is modified with PPy, which can not only effectively improve the oxidation characteristics of nZVI, but also promote its reactivity with (semimetal) heavy metal ions or radioactive elements.

In order to achieve the above objective, the present disclosure adopts the following technical solution:

A modified nZVI that is prepared by the above technical solution.

The third objective of the present disclosure is: aiming at defects in the prior art, the present disclosure provides an application of the modified nZVI, which can reduce and absorb heavy metal ions or radioactive elements, so as to achieve a purification effect.

In order to achieve the above objective, the present disclosure adopts the following technical solution:

An application of the modified nZVI, where the above modified nZVI is put into groundwater to reduce and absorb heavy metal ions or radioactive elements.

Compared with the prior art, the present disclosure has the beneficial effects:

1. According to the preparation method of the modified nZVI in the present disclosure, nZVI, a stabilizer and an oxidant are mixed to prepare a polymerization precursor solution, into which pyrrole is added for polymerization coating, and a polypyrrole-modified nZVI is then prepared in situ in one step. Compared with other modification methods, an in-situ polymerization method allows polypyrrole to coat nZVI more uniformly and improves the stability of nZVI; polypyrrole modification reduces the charge transfer resistance on the surface of composite material, promotes the diffusion rate of ions in a solution to the material, and promotes the contact and reaction between pollutants and materials. At the same time, polypyrrole modification can also enhance surface hydrophobicity of the material, reduce the action between iron core and water, and enhance the transfer rate of electrons to pollutants.

2. The polypyrrole-modified nZVI prepared in the present disclosure can quickly and efficiently (semimetal) heavy metal ions or radioactive elements, such as chromium (Cr6+), arsenic (As5+) and uranium (UO22+), in the water bodies. When an addition amount of the material is 1 g/L, 5 mg/L pollutants can be completely reduced and absorbed in 30 min, the first-order reaction kinetic constant can reach 0.19, 0.08 and 0.26 min−1, respectively, featuring high remediation efficiency and low cost.

DETAILED DESCRIPTION

Figure 1:
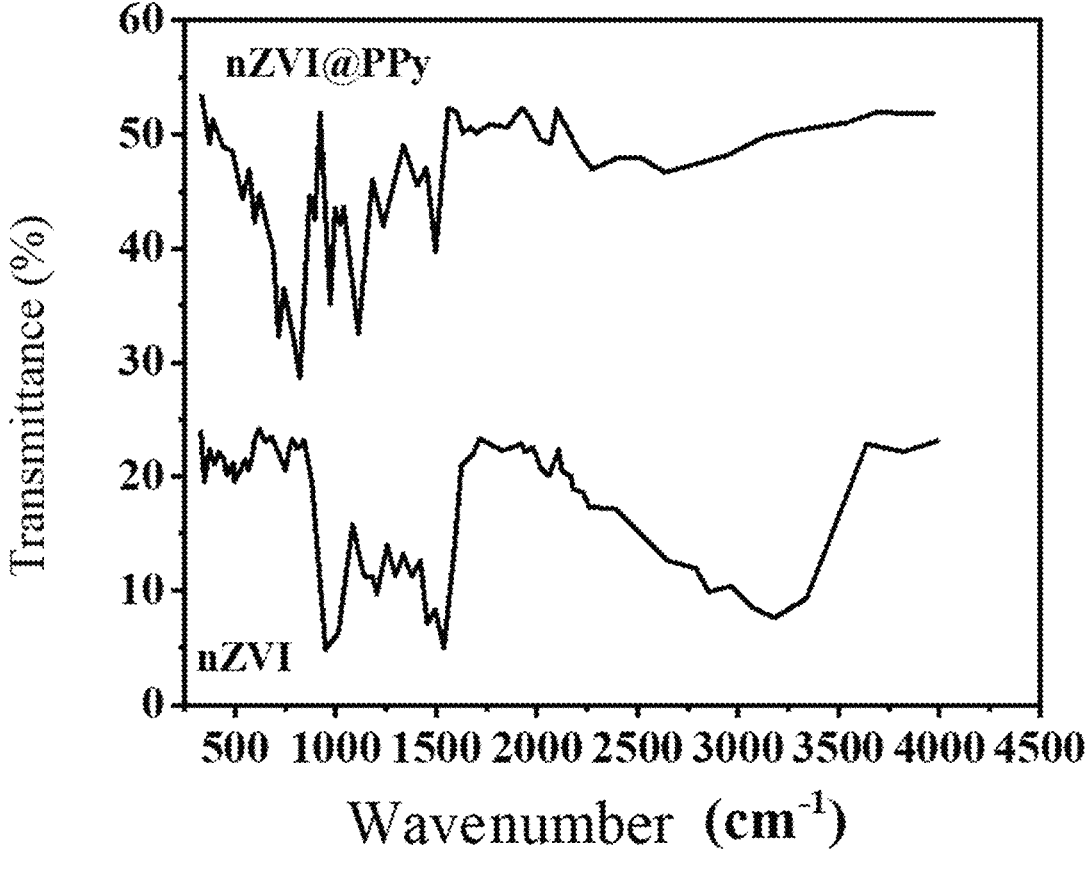
FIG. 1 is a comparison chart of infrared spectrograms between a modified nZVI of the present disclosure and an nZVI of the prior art.

The present disclosure will be described in further detail below in conjunction with specific examples and accompanying drawings, but the examples of the present disclosure are not limited thereto.

A preparation method of a modified nanoscale zero-valent iron (nZVI), including the following steps:

S1: mixing nZVI, a stabilizer and an oxidant together and stirring in an inert atmosphere to obtain a polymerization precursor solution; and S2: dripping pyrrole into the polymerization precursor solution prepared in the S1, maintaining an inert gas atmosphere for polymerization reaction, and performing cooling, filtration and vacuum drying to obtain the modified nZVI.

According to the preparation method of the modified nZVI in the present disclosure, nZVI, a stabilizer and an oxidant are mixed to prepare a polymerization precursor solution, into which pyrrole is added for polymerization coating, and a polypyrrole-modified nZVI is then prepared in situ in one step. Compared with other modification methods, an in-situ polymerization method allows polypyrrole to coat nZVI more uniformly and improves the stability of nZVI; polypyrrole modification reduces the charge transfer resistance on the surface of composite material, promotes the diffusion rate of ions in a solution to the material, and improves the contact and reaction between pollutants and materials. At the same time, polypyrrole modification can also enhance surface hydrophobicity of the material, reduce the action between iron core and water, and enhance the transfer rate of electrons to pollutants.

As a conductive polymer, polypyrrole (PPy) has lots of advantages, such as large specific capacitance, high conductivity, processability, chemical stability, and the like, which endows it with excellent conductivity, higher carrier mobility, special electrochemical activity, improved optical properties, good biocompatibility and other characteristics. The synergistic effect of PPy with other functional materials (such as carbon materials, metals, inorganic materials, other organic materials, and the like) can greatly expand the application range of PPy, such as enhancing chemical stability and cycle stability of materials. Therefore, compounding PPy into nZVI can not only enhance the stability and dispersion of the materials, but also reduce the surface charge transfer resistance of the materials, enhance the ion diffusion rate, enhance the transfer rate of electrons to pollutants, and promote the reactivity of heavy metal ions and composite materials.

Therefore, PPy is compounded into the surface of nZVI to form a new PPy modified zero-valent iron material (nZVI@PPy), which can not only effectively improve the oxidation characteristics of nZVI, but also promote its reactivity with (semimetal) heavy metal ions or radioactive elements, thereby expanding the application of nZVI in groundwater environment remediation.

Specifically, in the S1, the inert atmosphere is a nitrogen atmosphere with vigorous ultrasonic stirring at a stirring speed of 2,000 rpm/min−5,000 rpm/min; in the S2, the pyrrole needs to be added slowly, with 5-10 drops added per minute; and the room temperature after cooling is kept.

In some examples, the ratio in parts by weight of the nZVI to the stabilizer to the oxidant in the S1 is 1-30:1-6:0.1-5. The ratio in parts by weight of the nZVI to the stabilizer to the oxidant is 1-30:1-6:0.1-5, 3-28:3-6:0.5-5, 5-25:2-6:0.8-5, 5-25:2-6:1-5, 10-20:2-6:1.3-5, or 10-20:2-5:2-4. Specifically, the ratio in parts by weight of the nZVI to the stabilizer to the oxidant is 1:2:0.5, 5:2:1.5, 8:3:1.5, 10:5:2, 12:6:4, 20:6:4, 28:6:5, or 30:5:6.

In some examples, the ratio in parts by weight of the pyrrole to the polymerization precursor solution in the S2 is 0.001-0.05:20-500. The ratio in parts by weight of the pyrrole to the polymerization precursor solution is 0.001-0.05:20-500, 0.001-0.05:20-500, 0.001-0.05:20-500, or 0.001-0.05:20-500.

Specifically, the ratio in parts by weight of the pyrrole to the polymerization precursor solution is 0.008:22, 0.01:24, 0.02:29, 0.028:35, 0.034:80, 0.042:120, 0.048:280, 0.05:350, or 0.05:470.

In some examples, the oxidizer is one or more of ferric chloride, ferric nitrate nonahydrate or ammonium persulphate. Ferric chloride, ferric nitrate nonahydrate or ammonium persulphate all have a certain oxidation effect, and preferably, the ferric chloride is used as the oxidizer.

In some examples, the stabilizer is one or more of polyvinyl alcohol, polyvinylpyrrolidone, or sodium alginate. The stabilizer can reduce the reactivity of the nZVI and maintain some stability, facilitating dropwise addition of PPy, controlling the reaction rate and preparing the nZVI uniformly coated with PPy.

In some examples, the mass ratio of the stabilizer to the oxidizer is greater than 2:1. The mass ratios of the stabilizer to the oxidizer are 3:1, 4:1, 5:1, 6:1, and 7:1. The stabilizer and oxidizer work together to make the nZVI have some activity, which will not be too active and react too quickly, making the coating not uniform, and will not be too inactive and react too slowly, resulting in uniform coating.

In some examples, the stirring time in the S1 is 20-60 min. The stirring time in the S1 is 20 min, 28 min, 32 min, 35 min, 40 min, 45 min, 50 min or 55 min.

In some examples, the polymerization reaction time in the S2 is 1-6 h. The polymerization time is 1 h, 2 h, 3 h, 4 h, 5 h or 6 h.

A modified nZVI, the surface thereof is modified with PPy, which can not only effectively improve the oxidation characteristics of nZVI, but also promote its reactivity with (semimetal) heavy metal ions or radioactive elements.

A modified nZVI, where the modified nZVI is prepared by the above technical solution.

An application of the modified nZVI can reduce and absorb heavy metal ions or radioactive elements, so as to achieve a purification effect.

An application of the modified nZVI, where the above modified nZVI is put into groundwater to reduce and absorb heavy metal ions or radioactive elements.

The PPy-modified nZVI prepared in the present disclosure can quickly and efficiently remove (semimetal) heavy metal ions or radioactive elements, such as chromium (Cr6+), arsenic (As5+) and uranium (UO22+), in the water bodies. When an addition amount of the material is 1 g/L, pollutants at concentration of 5 mg/L can be completely reduced and absorbed in 30 min, and the first-order reaction kinetic constant can reach 0.19, 0.08 and 0.26 min−1, respectively, featuring high remediation efficiency and low cost.

Example 1

1. A preparation method of a modified nanoscale zero-valent iron (nZVI), including the following steps:
   S1: nZVI, a polyvinyl alcohol stabilizer and a ferric chloride oxidant were mixed together at a ratio in parts by weight of 20:5:2, and the mixture was stirred for 40 min in an inert atmosphere to obtain a polymerization precursor solution; and
   S2: pyrrole was dripped into the polymerization precursor solution prepared in the S1, where the ratio in parts by weight of the pyrrole to the polymerization precursor solution was 0.03:400. An inert gas atmosphere was maintained for 4 h for polymerization reaction, and then cooled to a room temperature, and filtration and vacuum drying were then performed to obtain the modified nZVI.

Figure 2:
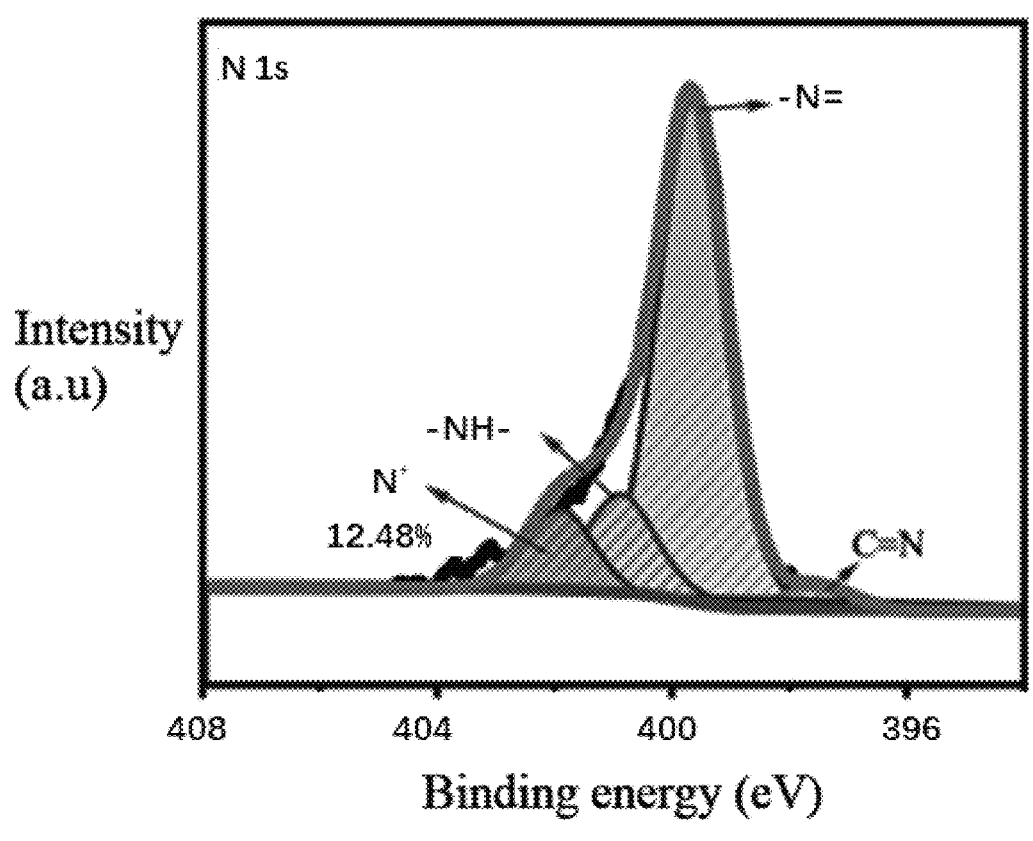
FIG. 2 is an N s XPS characterization diagram of a modified nZVI of the present disclosure.

Infrared spectrum detection was performed on the prepared material. As can be seen from the infrared spectrum in in FIG. 1, C—N stretching vibration absorption peak appeared at 1,470 cm−1, which proves that PPy successfully modified the nZVI. At the same time, as can be seen from the XPS characterization in FIG. 2, the nZVI does not contain N element, and the modified material has peaks of C═N and N—H, which also proves that PPy successfully modified the nZVI.

Example 2

Difference from Example 1: the ratio in parts by weight of nZVI, stabilizer and oxidizer is 16:5:3.

The rest are the same as Example 1, so it will not be repeated here

Example 3

Difference from Example 1: the ratio in parts by weight of the nZVI to the stabilizer to the oxidant is 11:5:4.

The rest are the same as Example 1, so it will not be repeated here

Example 4

Difference from Example 1: the ratio in parts by weight of the nZVI to the stabilizer to the oxidant is 26:5:1.

The rest are the same as Example 1, so it will not be repeated here.

Example 5

Difference from Example 1: the ratio in parts by weight of the nZVI to the stabilizer to the oxidant is 30:5:1.

The rest are the same as Example 1, so it will not be repeated here.

Example 6

Difference from Example 1: the ratio in parts by weight of the pyrrole to the polymerization precursor solution is 0.03:480.

The rest are the same as Example 1, so it will not be repeated here.

Example 7

Difference from Example 1: the ratio in parts by weight of the pyrrole to the polymerization precursor solution is 0.03:500.

The rest are the same as Example 1, so it will not be repeated here.

Example 8

Difference from Example 1: the ratio in parts by weight of the pyrrole to the polymerization precursor solution is 0.01:400.

The rest are the same as Example 1, so it will not be repeated here.

Example 9

Difference from Example 1: the ratio in parts by weight of the pyrrole to the polymerization precursor solution is 0.008:400.

The rest are the same as Example 1, so it will not be repeated here.

Example 10

Difference from Example 1: the ratio in parts by weight of the pyrrole to the polymerization precursor solution is 0.05:400.

The rest are the same as Example 1, so it will not be repeated here.

Comparative Example 1

Unmodified nZVI.

Comparative Example 2

PPy.

The nZVI prepared in Examples 1-10 and Comparative Examples 1-2 were respectively subjected to adsorption tests on hexavalent chromium, and the test results were shown in Table 1.

TABLE 1

| Item | Removal Rate (%) | Item | Removal Rate (%) |
|---|---|---|---|
| Example 1 | 98.9 | Example 2 | 96.7 |
| Example 3 | 95.8 | Example 4 | 95.8 |
| Example 5 | 96.5 | Example 6 | 95.3 |
| Example 7 | 96.7 | Example 8 | 96.8 |
| Example 9 | 96.4 | Example 10 | 96.5 |
| Comparative Example 1 | 61.2 | Comparative Example 2 | 33.4 |

Figure 5:
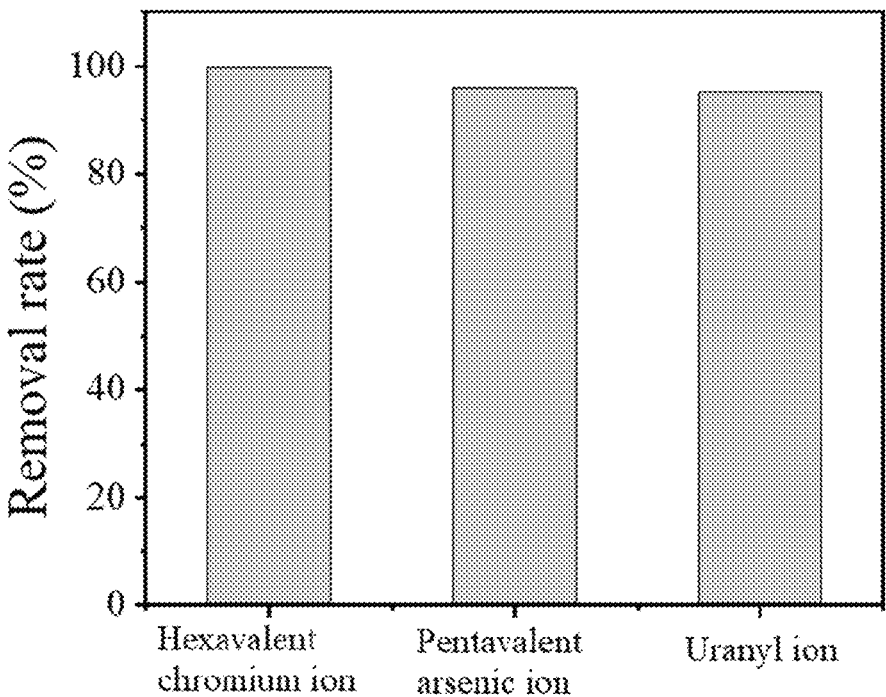
FIG. 5 is a bar chart of removal rates of chromium (Cr6+), arsenic (As5+) and uranium (U022+) by a modified nZVI of the present disclosure.
Figure 6:
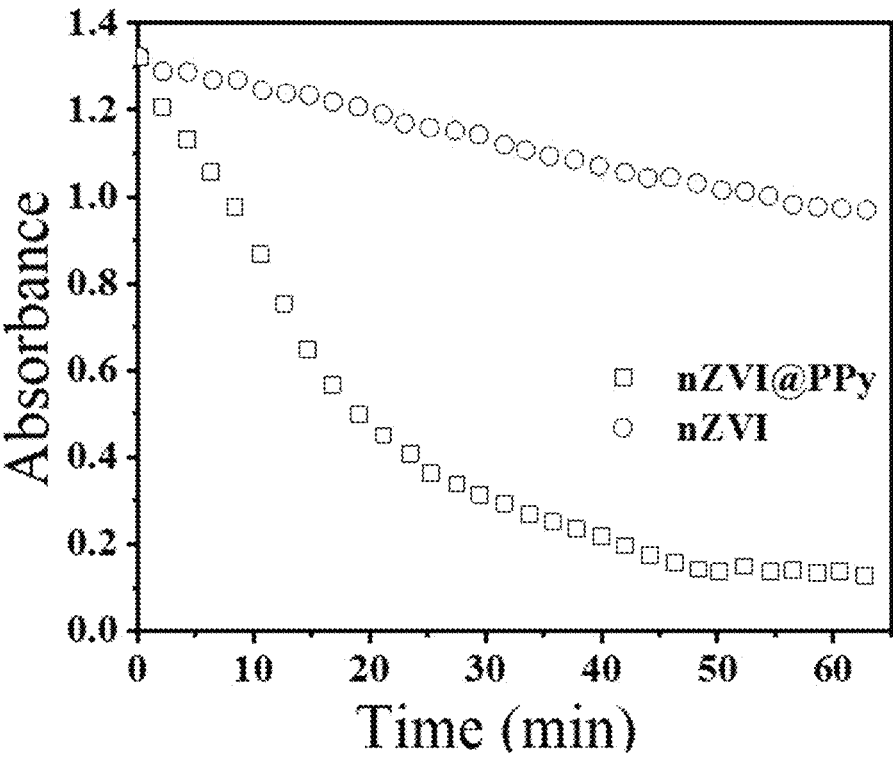
FIG. 6 is a comparison chart of colloidal stability of particles measured by detecting sedimentation kinetics through an ultraviolet spectrophotometer between a modified nZVI of the present disclosure and an nZVI of the prior art.
Figure 7:
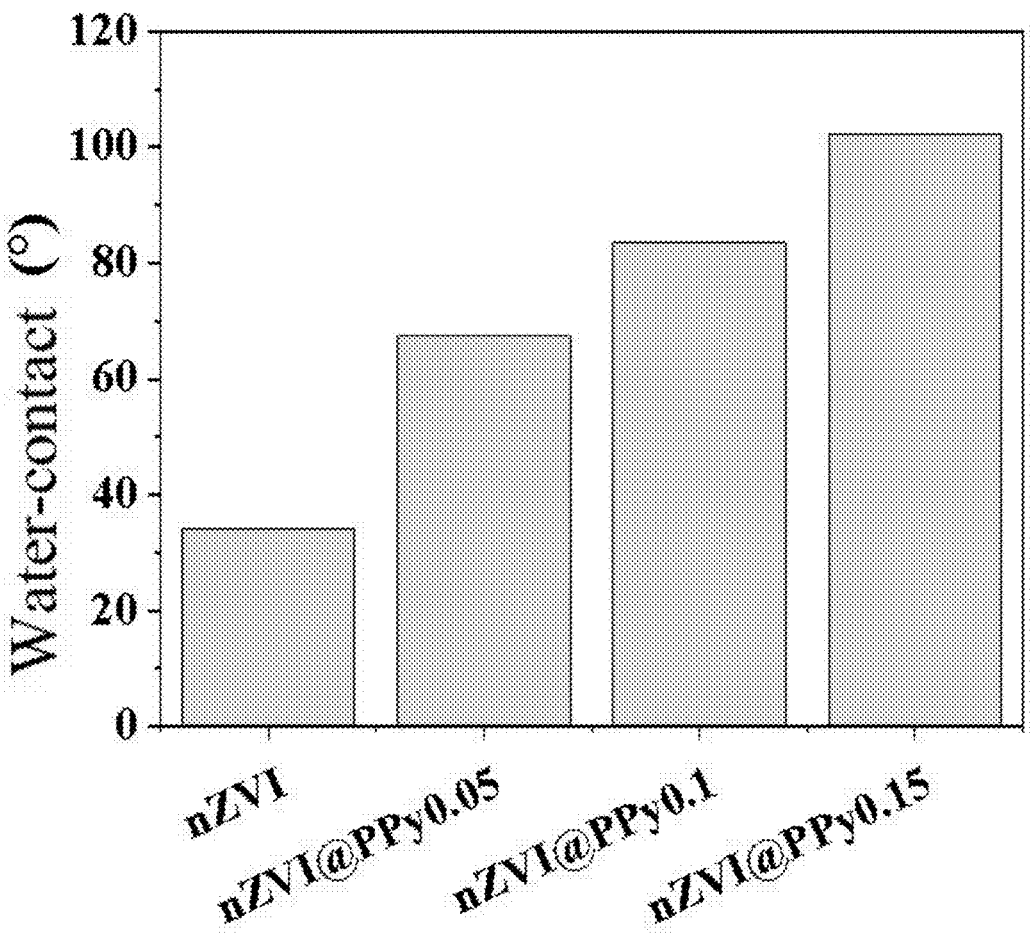
FIG. 7 is a bar chart of a water-contact angle of nZVI@PPy in which mass percentages of polypyrrole in a modified nZVI is 5%, 10% and 15%, respectively.
Figure 8:
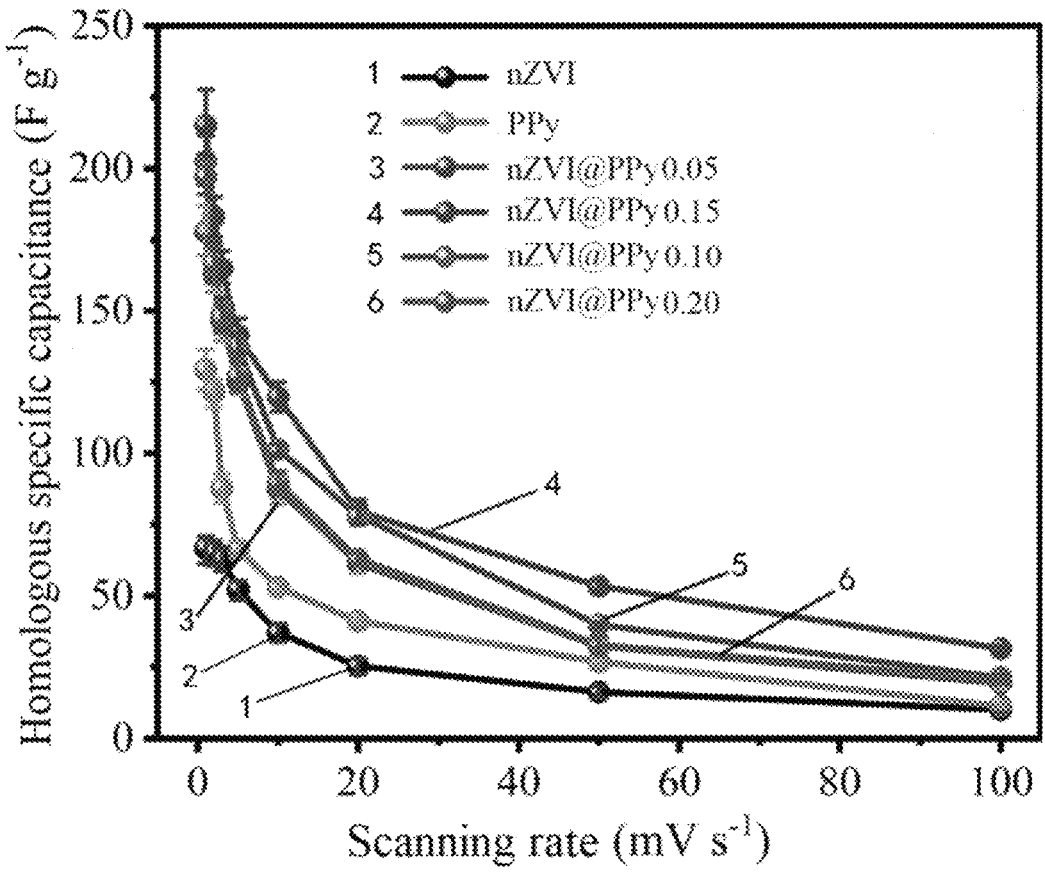
FIG. 8 is a comparison chart of a homologous specific capacitance of nZVI@PPy in which mass percentages of polypyrrole in a modified nZVI is 5%, 10%, 15% and 20%, respectively.

It can be concluded from Table 1 above that the modified nZVI prepared by the present disclosure has better adsorption and purification effect that the materials in comparative Examples 1-2. As shown in FIG. 5, the modified nZVI in the present disclosure has adsorption and removal rates of 98.9% for hexavalent chromium ions, 95% for pentavalent arsenic ions and 94% for uranyl ions. It can be concluded from FIG. 6 that the modified nZVI in the present disclosure has better stability than the unmodified nZVI. The unmodified nZVI exhibits rapid sedimentation, which is manifested by a rapid decline in absorbance, the sedimentation rate of nZVI@PPy decreases significantly, indicating that PPy modification weakens magnetic attraction between nZVIs and slows down the sedimentation of particles. It can be seen from FIG. 7 that the hydrophobicity of nZVI with PPy coating is better than that of nZVI without PPy coating, and the hydrophobicity of nZVI and PPy increases with the rising of the mass ratio of PPy when the mass percentage of PPy falls within 5%-15%. When the mass ratio of nZVI to PPy is 15%, the hydrophobicity is the best, and the modified nZVI can reduce the action between iron core and water, and enhance the transfer rate of electrons to pollutants. It can be concluded from FIG. 8, the mass ratio of PPy increases when the percentage of PPy content in nZVI@PPy falls within 5%-20%, indicating that increasing PPy content within the range is conducive to even coating of PPy on nZVI, and promoting charge transfer and ion transmission between the material interface and the solution. Continuous increasing PPy content will result in uneven agglomeration and distribution of PPy on nZVI, thereby leading to the blocking of ion diffusion and a decline of specific capacitance. Therefore, when the mass percentage of PPy is 15%, the modified nZVI prepared thereby has better performance, an evener PPy coating and good charge transfer and ion transmission.

By comparison with Examples 1-5, it can be concluded that the performance is better when the ratio in parts by weight of the nZVT to the stabilizer to the oxidant is 20:5:2, the consumption amount of stabilizer and oxidizer is appropriate, and the matching ratio of the stabilizer to the nZVI is also appropriate, so that the nZVI maintains a certain activity, so as to facilitate subsequent coating reaction with pyrrole and even coating.

By comparison with Examples 1, 6 and 10, it can be concluded that when the ratio in parts by weight of the pyrrole to the polymerization precursor solution is 0.03:400, the modified nZVI prepared thereby has better performance, this is because a certain amount of the pyrrole and the polymerization precursor solution can be uniformly coated, so that the nZVI coating is more uniform, the structure is more stable and the performance is better.

Figure 3:
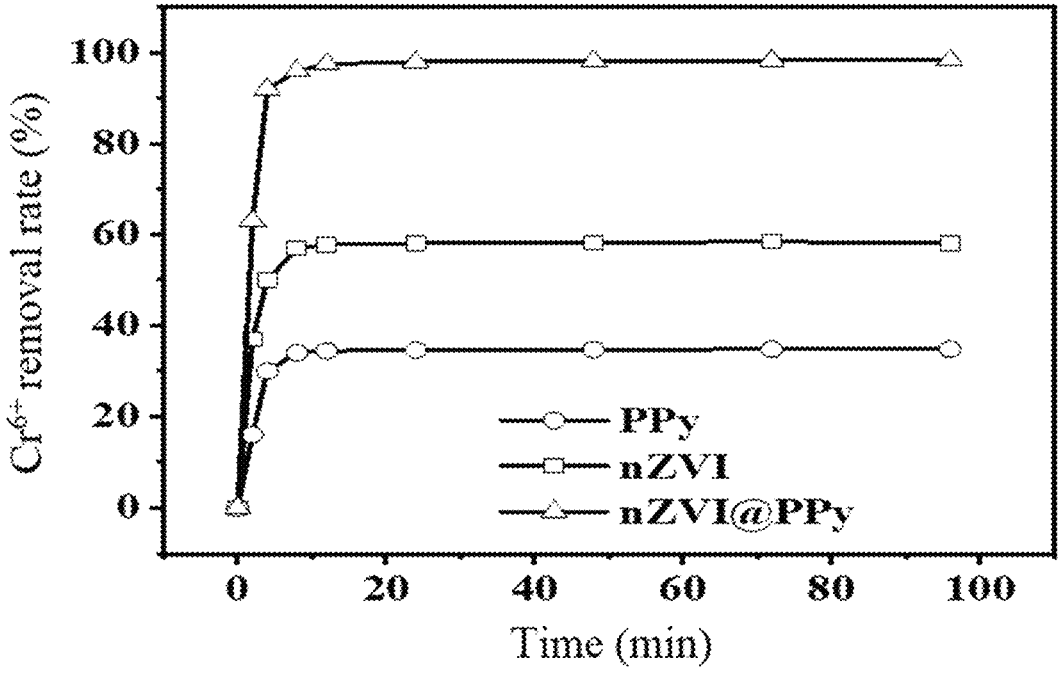
FIG. 3 is a comparison chart of removal rates of Cr6+ by a modified nZVI, an unmodified nZVI and a PPy.
Figure 4:
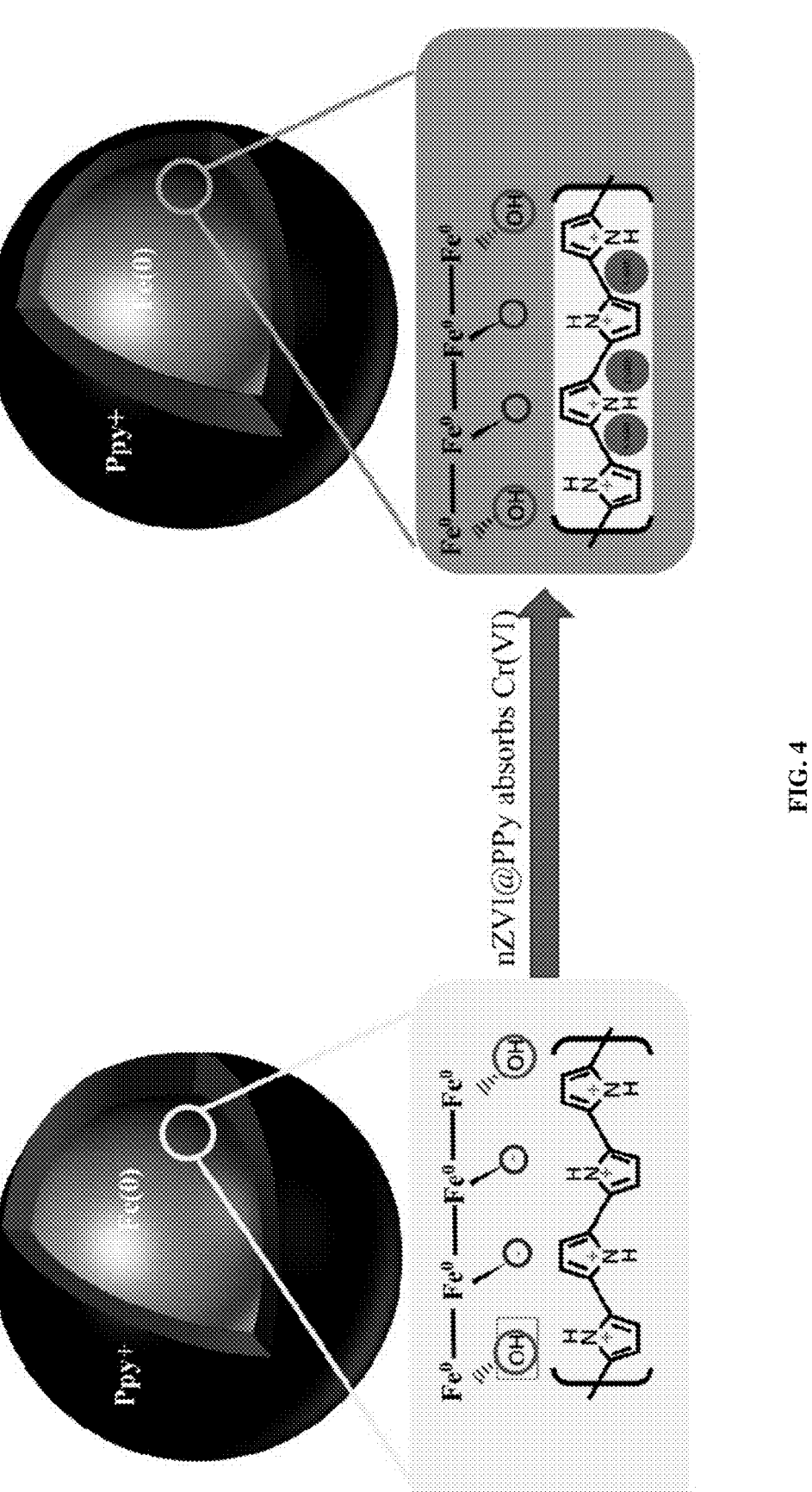
FIG. 4 is a schematic diagram of adsorption reaction of hexavalent chromium by a modified nZVI of the present disclosure.

By comparison with Example 1, Comparative Examples 1-2, it can be concluded that the modified pyrrole nZVI has better adsorption and purification effect than the unmodified pyrrole nZVI and PPy. It can be seen from FIG. 4 that hexavalent chromium is firmly adsorbed by the modified pyrrole nZVI, so that the hexavalent chromium is removed. It can be seen from FIG. 3 that the adsorption and removal rate of modified pyrrole nZVI approximates to 100%, and the adsorption and removal rates of the unmodified pyrrole nZVI and the PPy is about 57% and 33%, respectively.

The purification effect of the modified pyrrole nZVI prepared by the present disclosure is greater than the sum of the adsorption purification effect of the unmodified pyrrole nZVI and the PPy, so that the nZVI after modification achieves a significant improvement effect that 1+1 is greater than 2.

According to the disclosure and instruction of the above specification, those skilled in the art can make modifications and variations to the above examples. Therefore, the present disclosure is not limited to the above specific examples, and any obvious improvement, substitutions or variations made those skilled in the art on the basis of the present disclosure should fall within the protection scope of the present disclosure. In addition, although some specific terms are used in the specification, these terms are for convenience of description only and do not constitute any limitation to the present disclosure.

What is claimed is:

1. A preparation method of a modified nanoscale zero-valent iron (nZVI), comprising the following steps:
   S1: mixing nZVI, a stabilizer and an oxidant together and stirring in an inert atmosphere to obtain a polymerization precursor solution; and
   S2: dripping pyrrole into the polymerization precursor solution prepared in the S1, polymerizing the pyrrole while maintaining an inert gas atmosphere for the polymerization reaction, and performing cooling, filtration and vacuum drying to obtain the modified nZVI.

2. The preparation method of a modified nZVI according to claim 1, wherein the ratio in parts by weight of the nZVI to the stabilizer to the oxidant in the S1 is 1-30:1-6:0.1-5.

3. The preparation method of a modified nZVI according to claim 1 or 2, wherein the mass ratio of the stabilizer to the oxidant is greater than 2:1.

4. The preparation method of a modified nZVI according to claim 1, wherein the ratio in parts by weight of the pyrrole to the polymerization precursor solution in the S2 is 0.001-0.05:20-500.

5. The preparation method of a modified nZVI according to claim 1, wherein the oxidant is one or more of ferric chloride, ferric nitrate nonahydrate or ammonium persulphate.

6. The preparation method of a modified nZVI according to claim 1, wherein the stabilizer is one or more of polyvinyl alcohol, polyvinylpyrrolidone, or sodium alginate.

7. The preparation method of a modified nZVI according to claim 1, wherein the stirring time in the S1 is 20-60 min.

8. The preparation method of a modified nZVI according to claim 1, wherein the polymerization reaction time in the S2 is 1-6 h.

\* \* \* \* \*